US006445906B1

(12) United States Patent
Nguyen et al.

(10) Patent No.: US 6,445,906 B1
(45) Date of Patent: Sep. 3, 2002

(54) MICRO-SLOT ANTENNA

(75) Inventors: Henry Hoang Nguyen; David Pok Kwan; Michael Scott Pieper, all of Fort Worth, TX (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/408,672

(22) Filed: Sep. 30, 1999

(51) Int. Cl.[7] .......................... H04B 1/04; H04B 1/06; H04B 1/18; H01Q 1/26

(52) U.S. Cl. ......................... 455/73; 455/129; 455/269; 455/280; 343/700; 343/702; 343/701

(58) Field of Search ................................ 455/550, 575, 455/90, 281, 193.2, 193.1, 171, 500, 129, 280, 269; 343/702, 701, 889

(56) References Cited

U.S. PATENT DOCUMENTS 5,337,065 A * 8/1994 Bonnet et al. .............. 343/767
5,943,020 A 8/1999 Liebendoerfer ............. 343/343
6,133,879 A * 10/2000 Grangeat et al. ........... 343/700
6,184,833 B1 * 2/2001 Tran .................... 343/700 MS

* cited by examiner

*Primary Examiner*—Edward F. Urban
*Assistant Examiner*—Sheila Smith
(74) *Attorney, Agent, or Firm*—R. Louis Breeden; Matthew C. Loppnow

(57) ABSTRACT

An antenna (100) includes a rectangular dielectric substrate (102); and a U-shaped conductive strip attached to a first surface of the substrate, the U-shaped conductive strip having two side members (202, 203), each about one-eighth a predetermined wavelength in length, and an end member (204) forming a substantially rectangular slot (206) extending parallel to the long edges of the substrate, the slot closed at a first end (212) by the end member, and open at a second end (208). The antenna further includes a microstrip feed line (104) attached to a second surface of the substrate opposite and parallel to the first surface for coupling an RF signal between the antenna and an RF device (502), the microstrip feed line extending across and perpendicular to the slot proximate the second end of the slot, and further extending across a portion of the two side members; and a ground point (210) electrically coupled to a first one of the two side members of the U-shaped conductive strip and positioned proximate the second end of the slot.

15 Claims, 1 Drawing Sheet

100

100

100

100

500

MICRO-SLOT ANTENNA

FIELD OF THE INVENTION

This invention relates in general to wireless communications, and more specifically to a micro-slot antenna.

BACKGROUND OF THE INVENTION

Prior-art antennas used in portable wireless devices have included loop, ceramic chip, and microstrip patch antennas. The loop antenna is inexpensive, but does not perform well in free-field conditions. The ceramic chip antenna is relatively expensive and has moderate performance both in free-field and on-body environments. The microstrip patch antenna is very expensive and does not perform as well on body as in free-field.

The loop and chip antennas are predominantly vertically polarized, and their performance degrades when incoming signals have a non-vertical polarization. The microstrip patch antenna has both vertical and horizontal polarization, but it is not favorable in terms of size, weight, cost, and bandwidth.

Thus, what is needed is an antenna that has a small size, light weight, low cost, wider bandwidth, and both vertical and horizontal polarization. The antenna preferably will have excellent gain in both free-field and on-body environments.

SUMMARY OF THE INVENTION

An aspect of the present invention is a micro-slot antenna for use at a predetermined wavelength. The antenna comprises a rectangular dielectric substrate having two long edges and two short edges; and a U-shaped conductive strip attached to a first surface of the substrate, the U-shaped conductive strip having two side members, each about one-eighth the predetermined wavelength in length, and an end member forming a substantially rectangular slot extending parallel to the long edges, the slot closed at a first end by the end member, and open at a second end. The antenna further comprises a microstrip feed line attached to a second surface of the substrate opposite and parallel to the first surface for coupling an RF signal between the antenna and an RF device, the microstrip feed line extending across and perpendicular to the slot proximate the second end of the slot, and further extending across a portion of the two side members; and a ground point electrically coupled to a first one of the two side members of the U-shaped conductive strip and positioned proximate the second end of the slot.

Another aspect of the present invention is a radio device comprising a radio element including at least one of a transmitter and a receiver, a user interface coupled to the radio element for interfacing with a user; and a micro-slot antenna coupled to the radio element for use at a predetermined wavelength. The antenna comprises a rectangular dielectric substrate having two long edges and two short edges; and a U-shaped conductive strip attached to a first surface of the substrate, the U-shaped conductive strip having two side members, each about one-eighth the predetermined wavelength in length, and an end member forming a substantially rectangular slot extending parallel to the long edges, the slot closed at a first end by the end member, and open at a second end. The antenna further comprises a microstrip feed line attached to a second surface of the substrate opposite and parallel to the first surface for coupling an RF signal between the antenna and the radio element, the microstrip feed line extending across and perpendicular to the slot proximate the second end of the slot, and further extending across a portion of the two side members; and a ground point electrically coupled to a first one of the two side members of the U-shaped conductive strip and positioned proximate the second end of the slot.

DETAILED DESCRIPTION OF THE DRAWINGS

Figure 1:
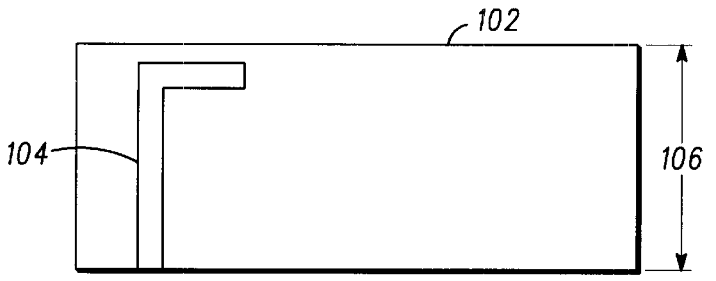
FIG. 1 is a top plan view of a micro-slot antenna in accordance with the present invention.

FIG. 1 is a top plan view of a micro-slot antenna 100 in accordance with the present invention. This view depicts a rectangular dielectric substrate 102 and a microstrip feed line 104. The substrate 102 is preferably formed from a conventional thin, low-loss, soft, dielectric material having a thickness of 0.51 to 0.76 mm and a dielectric constant of 3.0. The microstrip feed line 104 is preferably formed from copper having a thickness of 0.036 mm. The length 106 of the short edges is preferably about 1/24 of a predetermined wavelength of an RF signal which the antenna 100 is intended to intercept (e.g., 1.25 cm at 1 GHz). It will be appreciated that, alternatively, other similar materials, thicknesses, and dimensions can be substituted in accordance with the present invention.

Figure 2:
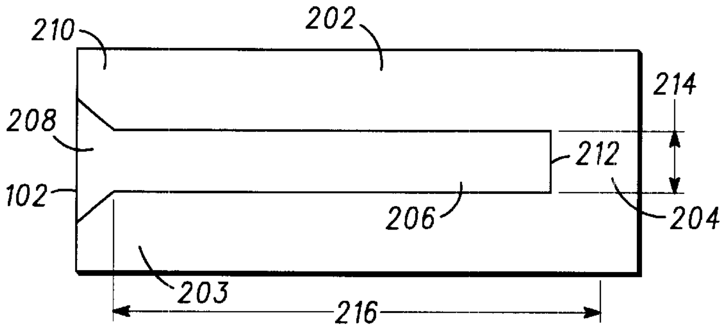
FIG. 2 is a bottom plan view of the micro-slot antenna in accordance with the present invention.

FIG. 2 is a bottom plan view of the antenna 100 in accordance with the present invention. This view depicts a U-shaped conductive strip attached to a first surface of the substrate 102, the U-shaped conductive strip comprising two side members 202, 203, each having an effective length 216 of about one-eighth the predetermined wavelength (e.g., 3.75 cm at 1 GHz). The U-shaped conductive strip also includes an end member 204. The U-shaped conductive strip forms a substantially rectangular slot 206 extending parallel to the long edges of the substrate 102, the slot 206 closed at a first end 212 by the end member 204, and open at a second end 208. The width 214 of the slot 206 is preferably 2.5 mm, except at the second end 208, where the slot 206 widens linearly to about 5 mm at the edge of the substrate. A ground point 210 on the side member 202 and positioned proximate the second end 208 of the slot 206 is utilized for grounding the antenna 100. The U-shaped conductive strip 202, 203, 204 preferably is formed from copper having a thickness of 0.36 mm. It will be appreciated that, alternatively, other similar materials, thicknesses, and dimensions can be substituted in accordance with the present invention.

Figure 3:
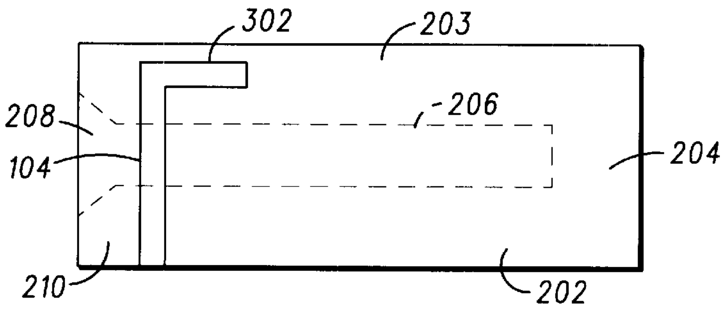
FIG. 3 is a top orthogonal view of the micro-slot antenna in accordance with the present invention.

FIG. 3 is a top orthogonal view of the antenna 100 in accordance with the present invention. Here the position and orientation of the microstrip feed line 104 with respect to the slot 206 and the U-shaped conductive strip 202, 203, 204 can be observed. Note that the microstrip feed line 104 extends across and perpendicular to the slot 206 proximate the second end 208 of the slot 206, and further extends across a portion of the two side members 202, 203. The microstrip feed line preferably also extends (extended portion 302) a distance parallel to the slot 206 and proximate a central portion of the side member 203 and towards the end member 204. Note that the side member 203 does not include the ground point 210, but is opposite the side member 202, which includes the ground point 210. The resonant frequency of the antenna 100 is tuned primarily by adjusting the effective length 216 of the two side members 202, 203. The resonant frequency is also affected by the length of the extended portion 302 of the microstrip feed line 104. The input impedance of the antenna 100 is adjusted by changing the width of the microstrip feed line and the width of the slot 206.

Figure 4:
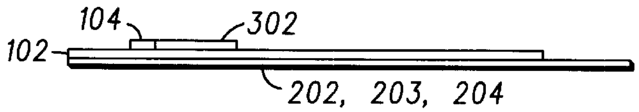
FIG. 4 is a front orthogonal view of the micro-slot antenna in accordance with the present invention.

FIG. 4 is a front orthogonal view of the antenna 100 in accordance with the present invention. This view is not drawn to scale. The view shows that the U-shaped conductive strip 202, 203, 204 and the microstrip feed line 104 are on opposite parallel surfaces of the substrate 102.

Due to size limitations in a portable communication device for which the antenna 100 is intended, the slot 206 cannot be made one-half-wavelength long for efficient radiation. For this reason, one end of the slot is left open. The micro-slot antenna 100 in accordance with the present invention functions through the theory of microstrip-to-slot transition. The microstrip feed line 104 and the U-shaped conductive strip 202, 203, 204 interact as follows to produce advantageous results. First, the U-shaped conductive strip 202, 203, 204 forms the slot 206, as described above. Second, the U-shaped conductive strip 202, 203, 204 is a narrow strip of conductor, one-quarter wave long, with one end grounded and the other end open, to form a standing wave along the strip. Energy propagates down the microstrip feed line 104, couples to the slot 206, and creates an electric field along the slot. A differential potential formed across the slot causes a current to flow around the U-shaped conductive strip. In effect, the open slot and the U-shaped conductive strip form two radiators in a single configuration. When the antenna 100 is oriented such that the electromagnetic wave propagated from the open slot is vertically polarized, then the U-shaped conductive strip produces a horizontally-polarized electric field, and vice versa. As a result, the micro-slot antenna 100 is linearly polarized with about 45 degrees of tilt.

Figure 5:
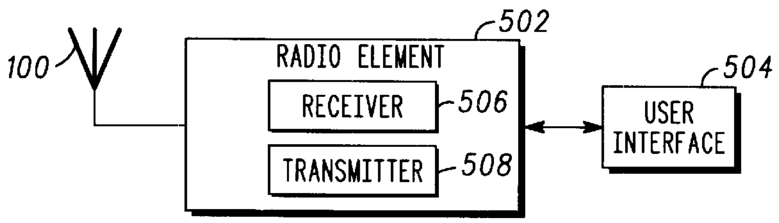
FIG. 5 is an electrical block diagram of an exemplary radio device in accordance with the present invention.

FIG. 5 is an electrical block diagram of an exemplary radio device 500 in accordance with the present invention. The radio device 500 comprises a conventional radio element 502 including at least one of a conventional receiver 506 and a conventional transmitter 508. The radio device 500 further comprises a conventional user interface 504 (e.g., control buttons and display) coupled to the radio element 502 for interfacing with a user. The radio device 500 also includes the micro-slot antenna 100 coupled to the radio element 502 for intercepting a radio signal to be received.

Thus, it should be clear from the preceding disclosure that the present invention advantageously provides an antenna that has a small size, light weight, low cost, and both vertical and horizontal polarization. Tests have determined that the antenna in accordance with the present invention also has a wider bandwidth than prior-art antennas and has an excellent gain in both free-field and on body environments, matching the performance of a conventional slot antenna in a fraction of the size.

What is claimed is:

1. A micro-slot antenna for use at a predetermined wavelength, the antenna comprising:

a rectangular dielectric substrate having two long edges and two short edges;

a U-shaped conductive strip attached to a first surface of the substrate, the U-shaped conductive strip having two side members, each about one, eighth the predetermined wavelength in length, and an end member forming a substantially rectangular slot extending parallel to the long edges, the slot closed at a first end by the end member, and open at a second end;

a microstrip feed line attached to a second surface of the substrate opposite and parallel to the first surface for coupling an RF signal between the antenna and an RF device, the microstrip feed line extending across and perpendicular to the slot proximate the second end of the slot, and further extending across a portion of the two side members; and a ground point electrically coupled to a first one of the two side members of the U-shaped conductive strip and positioned proximate the second end of the slot.

2. The antenna of claim 1, wherein the two short edges each are about one twenty-fourth the predetermined wavelength in length.

3. The antenna of claim 1, wherein the microstrip feed line further extends a distance parallel to the slot and proximate a central portion of a second one of the two side members and towards the end member, the second one of the two side members not including the ground point.

4. The antenna of claim 1, wherein the substrate is a thin, low-loss, soft, dielectric material.

5. The antenna of claim 1, wherein the microstrip feed line and the U-shaped conductive strip are formed of copper.

6. The antenna of claim 1, wherein the two short edges each are about one-twenty-fourth the predetermined wavelength in length.

7. The antenna of claim 1, wherein the microstrip feed line further extends a distance parallel to the slot and proximate a central portion of a second one of the two side members and towards the end member, the second one of the two side members not including the ground point.

8. The antenna of claim 1, wherein the substrate is a thin, low-loss, soft, dielectric material.

9. The antenna of claim 1, wherein the microstrip feed line and the U-shaped conductive strip are formed of copper.

10. A radio device, comprising:

a radio element including at least one of a transmitter and a receiver;

a user interface coupled to the radio element for interfacing with a user; and a micro-slot antenna coupled to the radio element for intercepting a radio signal to be received at a predetermined wavelength, the antenna comprising a rectangular dielectric substrate having two long edges and two short edges;

a U-shaped conductive strip attached to a first surface of the substrate, the U-shaped conductive strip having two side members, each about one-eighth the predetermined wavelength in length, and an end member forming a substantially rectangular slot extending parallel to the long edges, the slot closed at a first end by the end member, and open at a second end;

a microstrip feed line attached to a second surface of the substrate opposite and parallel to the first surface for coupling an RF signal between the antenna and the radio element, the microstrip feed line extending across and perpendicular to the slot proximate the second end of the slot, and further extending across a portion of the two side members; and a ground point electrically coupled to a first one of the two side members of the U-shaped conductive strip and positioned proximate the second end of the slot.

11. The radio device of claim 10, wherein the two short edges each are about one-twenty-fourth the predetermined wavelength in length.

12. The radio device of claim 10, wherein the microstrip feed line further extends a distance parallel to the slot and proximate a central portion of a second one of the two side members and towards the end member, the second one of the two side members not including the ground point.

13. The radio device of claim 10, wherein the substrate is a thin, low-loss, soft, dielectric material.

14. The radio device of claim 10, wherein the microstrip feed line and the U-shaped conductive strip are formed of copper.

15. A micro-slot antenna for use at a predetermined wavelength, the antenna comprising:

a rectangular dielectric substrate having two long edges and two short edges;

a U-shaped conductive strip attached and parallel to a first surface of the substrate, the U-shaped conductive strip having two side members, each about one-eighth the predetermined wavelength in length, and an end member forming a substantially rectangular slot extending parallel to the long edges, the slot closed at a first end by the end member, and open at a second end;

a microstrip feed line attached and parallel to a second surface of the substrate opposite and parallel to the first surface for coupling an RF signal between the antenna an RF device, the microstrip feed line extending across and perpendicular to the slot proximate the second end of the slot, and further extending across a portion of the two side members; and a ground point electrically coupled to a first one of the two side members of the U-shaped conductive strip and positioned proximate the second end of the slot.

* * * * *

UNITED STATES PATENT AND TRADEMARK OFFICE

CERTIFICATE OF CORRECTION

PATENT NO. : 6,445,906 B1
DATED : September 3, 2002
INVENTOR(S) : Nguyen et al.

It is certified that error appears in the above-identified patent and that said Letters Patent is hereby corrected as shown below:

Column 4,
Line 1, change "one, eighth" to -- one-eighth --
Line 47, change "comprising" to -- comprising: --

Column 6,
Line 8, add -- and -- after "antenna"

Signed and Sealed this

Eleventh Day of February, 2003

JAMES E. ROGAN
*Director of the United States Patent and Trademark Office*